United States Patent [19]
Guyomard et al.

[11] Patent Number: 5,485,941
[45] Date of Patent: Jan. 23, 1996

[54] RECIRCULATION SYSTEM AND METHOD FOR AUTOMATED DOSING APPARATUS

[75] Inventors: Daniel Guyomard, Lamorkoye, France; James L. Anderson, Jr., Howell, Mich.; Alfred Frank, Toledo, Ohio; Georges Chavaillaz, Saint Sulpice, Switzerland

[73] Assignees: BASF Corporation, Mt. Olive, N.J.; Cydec S.A., Switzerland

[21] Appl. No.: 268,929

[22] Filed: Jun. 30, 1994

[51] Int. Cl.⁶ ............................................ B67D 5/08
[52] U.S. Cl. ................... 222/1; 222/55; 222/61; 222/318
[58] Field of Search .................... 222/1, 55, 56, 222/61, 110, 136, 318, 389, 394, 397, 399, 638, 639; 137/563; 141/9, 104; 364/479

[56] References Cited

U.S. PATENT DOCUMENTS

| | | | |
|---|---|---|---|
| 3,670,785 | 6/1972 | Heiss et al. | 141/9 |
| 4,473,173 | 9/1984 | DeGroff et al. | 222/63 |
| 4,688,944 | 8/1987 | Mumenthaler | 366/137 |
| 4,739,904 | 4/1988 | Spencer et al. | 222/109 |
| 4,784,295 | 11/1988 | Holmstrand | 222/148 |
| 4,989,756 | 2/1991 | Kagamihara et al. | 222/55 |
| 5,042,688 | 8/1991 | Srivastava et al. | 222/55 |
| 5,108,074 | 4/1992 | Chavaillaz | 251/205 |
| 5,129,551 | 7/1992 | Gott | 222/135 |
| 5,148,945 | 9/1992 | Geatz | 222/1 |
| 5,332,125 | 7/1994 | Schmitkons et al. | 222/55 |

FOREIGN PATENT DOCUMENTS

0353197  1/1990  European Pat. Off. .

*Primary Examiner*—Andres Kashnikow
*Assistant Examiner*—Philippe Derakshani
*Attorney, Agent, or Firm*—Nixon & Vanderhye

[57] ABSTRACT

A recirculation system associated with an automated dosing apparatus employs pressurized supply canisters for flowable materials to be dosed and a recirculation loop which permits the flowable materials to be recirculated through the dosing head and returned to the pressurized supply canisters. The recirculation system includes a buffer reservoir which is fluid-connected to both the dosing head and the pressurized supply canister. During a recirculation mode, the flowable material supplied to the dosing head will be caused to recirculate through channels defined in the dosing head and thereafter be directed to the buffer reservoir. The recirculated paint will accumulate in the buffer reservoir until the recirculation mode has been completed. At that time, a transfer mode will be initiated so as to cause the buffer reservoir to be pressurized greater than the pressure existing in the stock canister. This greater pressure within the buffer reservoir will thereby serve to forcibly transfer the accumulated recirculated paint therein to the supply canister.

19 Claims, 6 Drawing Sheets

RECIRCULATION SYSTEM AND METHOD FOR AUTOMATED DOSING APPARATUS

FIELD OF INVENTION

The present invention generally relates to the field of automated dosing apparatus. More specifically, the present invention relates to recirculation systems and methods useful in automated dosing apparatus which dispense highly precise quantities (doses) of flowable components to be mixed.

BACKGROUND AND SUMMARY OF THE INVENTION

Automotive refinishers typically maintain a relatively small inventory of paint colors which can be mixed selectively according to preset recipes to achieve a precise color match for virtually any make and model year of automobile. Thus, the automotive refinisher can realize considerable inventory cost savings by maintaining a relatively small inventory of paint colors which can be mixed, when needed, on a batch-wise basis in order to match a particular original paint color. Indeed, it would essentially be cost-prohibitive for automotive refinishers to maintain an entire inventory of premixed paint colors matching the original paint for all automobile manufacturers since the formulations of automotive paint colors can, and often do, change from one model year to the next.

The conventional practice, however, in the automotive refinishing business is for the individual paint colors to be admixed manually. That is, when a specific paint color for a particular automobile make and model year is needed to be matched, the automotive refinisher will manually dispense each individual paint color component from the refinisher's inventory until the desired dosage weight (which is determined by a color-matching recipe) is achieved. Therefore, by combining these manually dispensed dosage weights for each individual paint color component, a batch of the desired automotive paint color to be matched may be obtained.

However, manually dispensing individual paint color components cannot always accurately duplicate the paint formulation recipes. For example, there exists the practical limit of scale accuracy when the individual doses of paint components are weighed. Furthermore, the weighed doses of individual paint components are typically dispensed sequentially into a single mixing receptacle so as to minimize inaccuracies that might otherwise accrue by dispensing the individual doses into segregated weighing receptacles and thereafter combining the individual doses. Thus, there exists the real possibility that human error could cause a single paint color to be over-dispensed into a batch of previously dispensed paint color components resulting in the waste of the entire paint batch.

Automated dosing equipment is known and employed in a number of end-use applications where highly precise quantities (doses) of components are desired to be admixed according to preset recipes. For example, some commercial paint mixing systems are known which are provided with a scale and a computer-assisted correction function. According to such known systems, when an over-dose of a particular component occurs, the other component(s) will be added in small quantities under computer control so as to compensate for the over-dosed component. However, the addition of additional quantities of components to compensate for the over-dosed component could its,elf lead to new dosing errors and is therefore not an entirely satisfactory solution.

An automated dosing apparatus is also known from published European Patent Application No. 0353197 (hereinafter "EP'197") whereby individual flowable components may be added together and mixed in precise quantities. Specifically, FIG. 2 in EP '197 discloses a system which includes a multiple outlet (e.g., 3-way) diverting valve whereby an individual component flowing from a pressurized supply container may either be directed to a dosing head or recirculated to its supply canister. However, since the supply canister is pressurized, a downstream pump is necessary in order to overcome the pressure in the supply canister during recirculation and thereby cause the individual component to return to the supply canister through the recirculation line.

While one could envision using automated dosing equipment of the variety disclosed in EP '197 for purposes of dispensing highly accurate doses of individual automotive paint colors (and thereby render obsolete the conventional manual dosing techniques used by automotive refinishers), there would still be present several real, non-trivial technical problems. For example, since automotive refinish paint is typically a mixture of solid pigments in a suitable carrier (e.g., resin and solvent), there exists the possibility of pigment sedimentation and/or carrier flotation (hereinafter more simply termed "paint separation") in the dosing equipment, particularly in the lines which feed paint to the dispensing head from a paint supply container, during those time periods that the equipment is idle. Paint separation could therefore result in gross inaccuracies during the automated dosing procedure leading to color variations, and hence color mismatches.

The recirculation of the paint through the automated dosing equipment as part of the equipment start-up procedures and/or prior to each dosing operation could remedy paint separation problems. However, as noted briefly above, in the pressurized paint supply system disclosed in EP '197, the paint would only recirculate through the diverting valve and not through the dosing head (i.e., since the diverting valve is positioned upstream of the dosing head). Thus, any paint which lies dormant in the line fluid-connecting the diverting valve to the dosing head would still be subject to paint separation.

It would therefore be highly desirable in automotive refinish paint applications if a recirculation system and technique could be provided for automated dosing apparatus which allows individual paint components to be recirculated through the dosing head. Such a recirculation system could thus ensure that no pigment sedimentation exists in the individual paint component dose and thereby increase the accuracy associated with the automated batch mixture of paint components. It is towards providing such improvements that the present invention is directed.

Broadly, the present invention is embodied in a recirculation system associated with an automated dosing apparatus which employs pressurized supply canisters for the individual flowable components to be dosed and a recirculation loop which permits the flowable components to be recirculated through the dosing head and returned to their respective pressurized supply canisters. The recirculation system according to this invention more specifically includes buffer reservoirs which are fluid-connected to both the dosing head and a respective pressurized supply canister. During a recirculation mode, therefore, a flowable component supplied to the dosing head will be caused to recirculate through channels defined in the dosing head and thereafter be directed to a respective buffer reservoir. The recirculated paint will accumulate in the buffer reservoir until the recirculation mode has been completed. At that time, a transfer mode will be initiated so as to cause the buffer reservoir to be pressurized greater than the pressure existing in the stock canister. This greater pressure within the buffer reservoir will thereby serve to forcibly transfer the accumulated recirculated paint therein to the supply canister.

Any number of such recirculation/flow loops may be provided in the automated apparatus of this invention in dependence upon the number of individual components of flowable material that may need to be admixed in metered amounts.

As a result of this invention, therefore, the flowable components will be completely circulated through the dosing head so as to purge the flow lines to the dispensing nozzle in the dosing head and ensure highly accurate dosing. This advantage of the present invention, as well as others, will become more clear after careful consideration is given to the following detailed description of the preferred exemplary embodiment.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

The present invention may be employed usefully with virtually any material which is itself in a flowable state (e.g., liquids, pastes, slurries or the like) or which can be induced to assume a flowable state (e.g., thixotropic materials). Therefore, as used herein and in the accompanying claims, the terms "flowable component", "flowable material", and like terms are meant to refer to any material which is flowable during the recirculation and transfer modes of the equipment.

Figure 1:
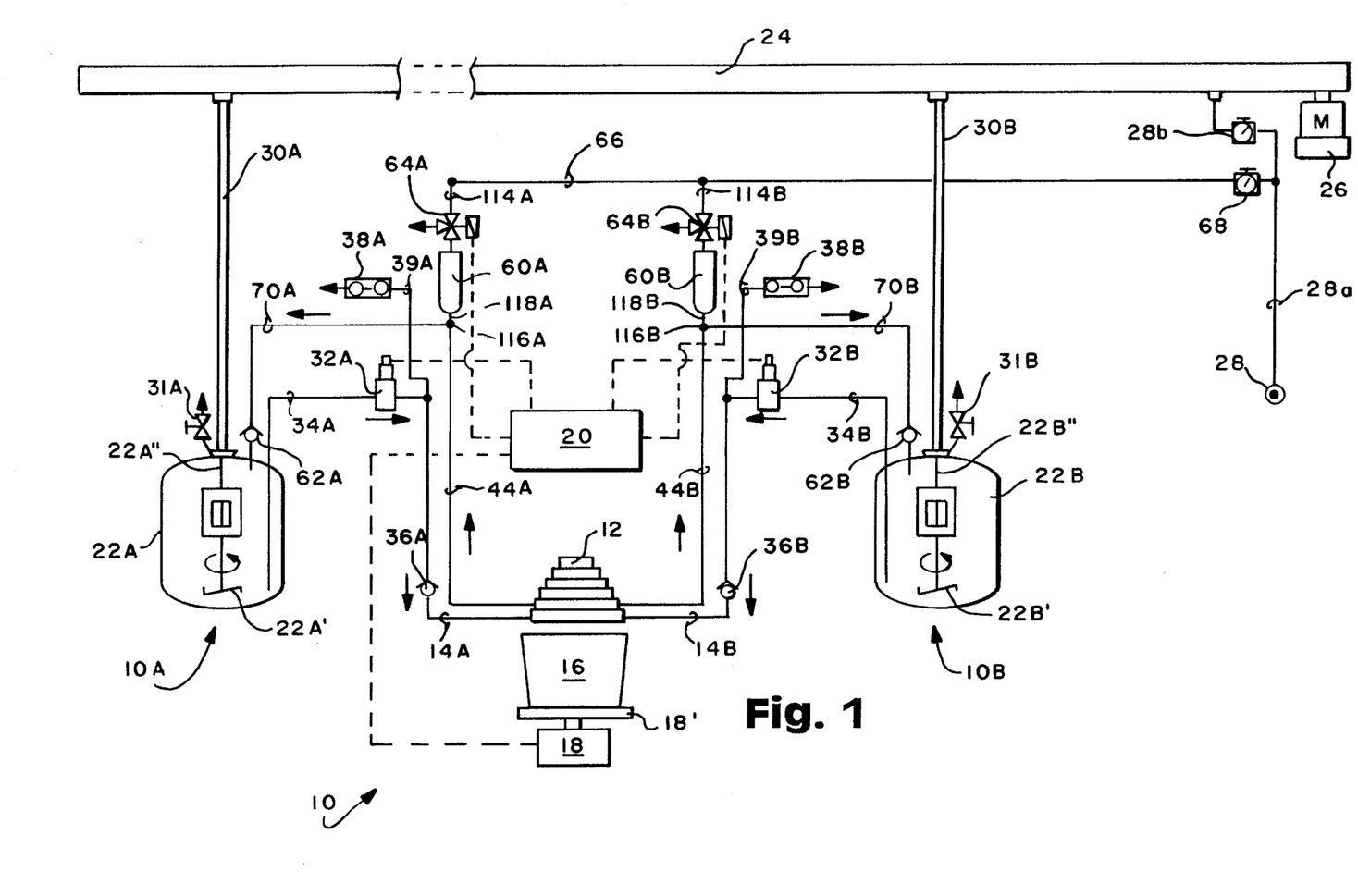
FIG. 1 is a schematic representation of an automated paint dosing apparatus which includes the recirculation system according to the present invention.

A schematic representation of automated dosing equipment 10 according to the present invention is depicted in accompanying FIG. 1. In this regard, the automated dosing equipment 10 is depicted having two paint flow loops 10A, 10B for purposes of discussion. However, it is to be understood that the automated dosing equipment 10 may be provided with virtually any number of flow loops to suit particular end-use applications in dependence upon the particular number of components that may need to be dosed. For example, the particular embodiment of the dosing equipment 10 shown in FIGS. 3–4 just happens to have the capability of dispensing thirty-six individual components, but greater or lesser dispensing capabilities are within the scope of this invention.

The dosing equipment 10 includes a dosing head 12 which serves to dispense individual paint ,components fed thereto via feed lines 14A, 14B associated with the flow loops 10A, 10B, respectively. The dispensed paint components are received within an open-top mixing container 16 which rests on a weighing platform 18' associated with a precision gravimetric scale 18. As paint components are dispensed into the container 16. therefore, the gravimetric scale 18 will issue a signal indicative of the cumulative weight of the paint in the container 16 to a PC-based controller 20.

A suitable supply of each individual paint component is maintained in stock canisters 22A, 22B, each of which is provided with internal rotatable agitators 22A', 22B', respectively. The agitators 22A', 22B' are operatively coupled to a drive chain 23 (see FIGS. 3 and 4) housed within a closed pressurization manifold 24 by means of a flexible torque cable 22A", 22B", respectively. The drive chain 23 within the manifold 24 is driven by means of electric motor 26. Therefore, operation of motor 26 serves to drive the drive chain 23 within the manifold 24 so as to, in turn, rotate the flexible torque cables 22A", 22B" and hence turn the agitators 22A', 22B', respectively.

A header 28 supplies a pressurization fluid (e.g., a gas such as nitrogen or, more preferably, air) to the pressurization manifold 24 via line 28a. The pressurization fluid from header 28 will thus pass a pressure regulator 28b which sets the pressure of the fluid at a selected level (e.g., 1.5 to 2.5 bar). The pressurization fluid from the manifold is then introduced into the individual stock canisters 22A, 22B via pressurization conduits 30A, 30B, respectively. The pressurization conduits 30A, 30B coaxially surround the torque cables 22A", 22B" so as to establish an annular space through which the pressurization fluid may pass on to the stock canisters 22A, 22B, respectively. As a result, the paint supply within the stock canisters 22A, 22B is maintained under pressure greater than atmospheric pressure. Each of the stock tanks 22A, 22B is provided with a pressure relief valve 31A, 31B, respectively, so as to allow the stock tanks to be depressurized when needed.

Although it is presently preferred to employ coaxial torque cables 22A", 22B" and pressurization conduits 30A, 30B, respectively, it is of course possible to provide such structures independently of one another. That is, it is possible to provide, as an alternative arrangement, whereby the driving means for the agitators 22A', 22B' is structurally independent of conduits used to pressurize the canisters 22A, 22B.

When it is desired to dispense a dose of paint, the controller 20 will issue a command signal to one of the normally closed precision dosage valves 32A, 32B. The dosage valves 32A, 32B will thus open in response to receiving a respective command signal from the controller 20. Since the paint supply within the canisters 22A, 22B is pressurized as described above, operation of one of the dosage valves 32A, 32B will cause paint to be withdrawn from one of the stock canisters 22A, 22B via lines 34A, 34B then on to the dosing head 12 via lines 14A, 14B, respectively.

One-way check valves 36A, 36B are provided in lines 14A, 14B, respectively, so as to prevent back-flow of paint. Furthermore, when a relatively viscous liquid (e.g., automotive refinish paint) is employed as the flowable component, the check valves 36A, 36B serve to prevent uncontrolled dripping of the flowable component from the discharge head 12. That is, by positioning the check valves 36A, 36B closely adjacent (and preferably directly connected) to the discharge head 12, the discharge of the flowable component at the end of the dispensing mode will reliably be terminated. Therefore, separate closing valves for the individual nozzles in the discharge head 12 will not necessarily need to be provided due to the presence of the one-way check valves 36A, 36B so as to avoid nozzle clogging with dried material which could otherwise result.

Relief valves 38A, 38B are provided in branch lines 39A, 39B (which are fluid-connected at the juncture of lines 14A/34A and 14B/34B) so as to permit the escape of any air or gas that may have become entrained or dissolved under pressure in the paint.

Feed-back control of the dosage valves 32A, 32B on the basis of the weight of paint dispensed into the container 16 is provided by the electronic gravimetric scale 18. That is, controller 20 will be pre-programmed with desired recipes requiring the addition of precise quantities of paint components. For example, upon sensing that the correct dose of paint has been dispensed from the stock canister 22A by the weight signal provided by the gravimetric scale 18, the controller 20 will responsively issue a command signal to dosage valve 34A to cause the valve 34A to assume its closed condition and thereby terminate the dispensing operation of paint from stock canister 22A. Thereafter, according to the preprogrammed recipe, the controller may then issue a command signal to the other dosage valve 32B so as to cause it to assume its opened condition and thereby responsively permit paint to be dispensed into the container 16 from the stock canister 22B. Again, when the correct dose of paint from stock canister 22B has been sensed by the controller 20 according to the preprogrammed recipe by virtue of the cumulative weight signal provided by gravimetric scale 18, a command signal will be issued to valve 32B, closing it and thereby terminating the flow of paint from stock canister 22B. This procedure is repeated for each individual component that may be needed in order to satisfy the requirements of the particular preprogrammed recipe.

At this point in time, the dosing of each component is essentially an approximation (e.g. 95–98%) of the total quantity of material that is needed to satisfy the recipe. Thus, in order to achieve the final quantity of material needed, the controller 20 receives a signal from the electronic scale 18 and calculates the missing quantity of each individual component. The dosing valves 32A, 32B may then be operated sequentially (or simultaneously) so as to deliver precalibrated volumetric strokes of material to achieve the precise total quantity of material according to the recipe. This combination of approximate gravimetric dispensing followed by volumetric strokes therefore offers several advantages in terms of lesser dispensing time and better dispensing accuracy. At the end of the multi-component dosing, the total amount of material is checked again by the electronic scale 18 providing the controller 20 with a total weight signal.

The preferred metering valves 32A, 32B which are employed in the practice of this invention are, in and of themselves, conventional. In this regard, the preferred metering valves 32A, 32B are commercially available from Cydec S. A, and are described more fully in U.S. Pat. No. 5,108,074, the entire content of which is expressly incorporated hereinto by reference. It will be noted, however, that the preferred metering valves have only a single inlet port and a single discharge port. That is, the metering valves do not have any flow bypass functions and, as a result, when opened only allow paint to flow to the dosing head 12.

Figure 3:
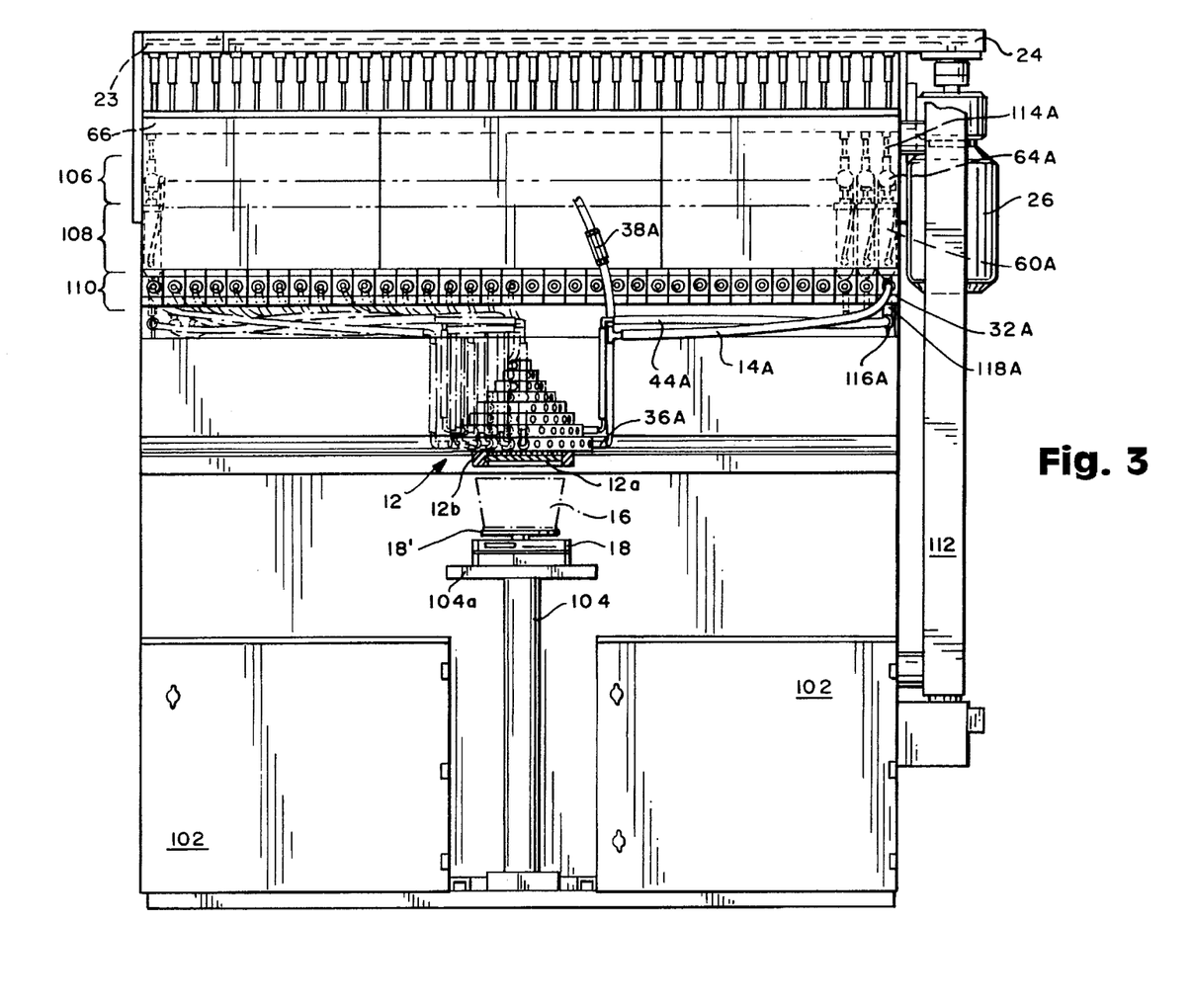
FIG. 3 is a front elevational view of an automated paint dosing apparatus which includes the recirculation system according to the present invention.

When it is desired to recirculate paint through the dosing head 12 and back to its respective stock canister, a rigid plate 12a is inserted into the holder 12b (see FIG. 3). Thus, plate 12a blocks the flow of paint from the discharge nozzles, each of which is dedicated to a particular paint color.

Figure 2:
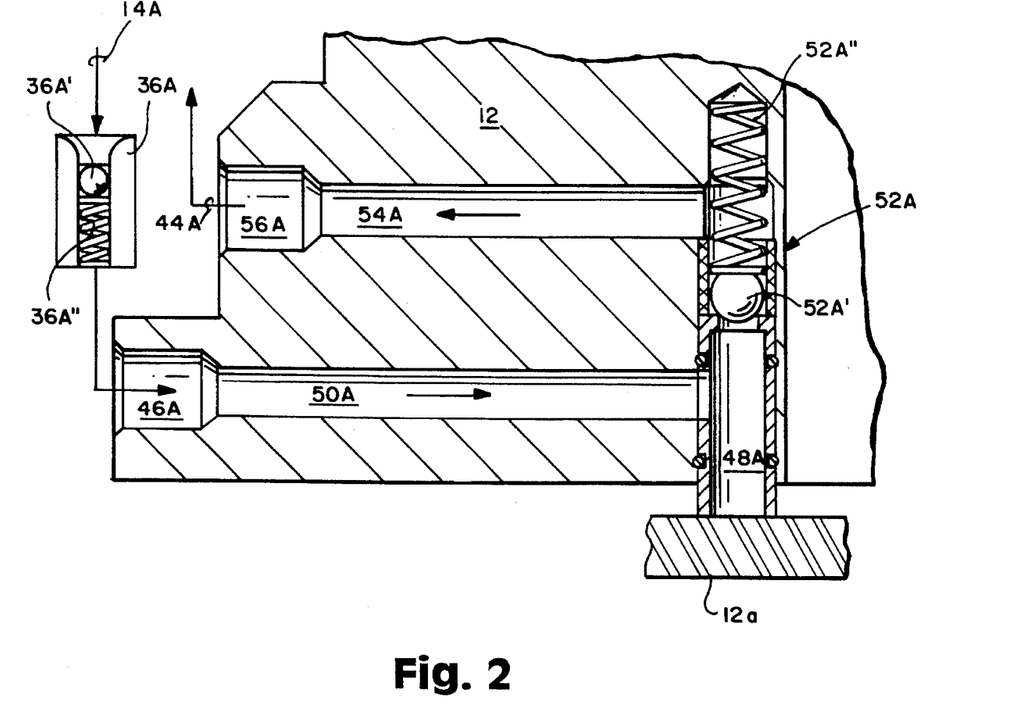
FIG. 2 is a partial cross-sectional view representative of the flow path within the dosing head for an individual paint component.

Accompanying FIG. 2 shows a representative flow path within the dosing head 12 for the paint supply and recirculation lines 14A and 44A, respectively, associated with flow loop 10A. In this regard, the flow of paint through supply 14A will unseat the ball 36A' against the force of its spring 36A" within the one-way flow valve 36A. Paint will then be allowed to enter the supply port 46A. The supply port 46A is fluid-connected to its dedicated discharge nozzle 48A via supply channel 50A. However, since the outlet end of the discharge nozzle 48A is blocked by means of plate 12a, the paint enters the recirculation channel 54A by unseating the ball 52A' against the force of spring 52A" associated with the internal one-way flow valve 52A. The paint is thus caused to be discharged into recirculation line 44A through recirculation port 56A.

The paint component which flows through the recirculation line 44A will be introduced into a closed buffer reservoir 60A associated with the flow loop 10A. During the recirculation mode, the buffer reservoir will be maintained at a pressure substantially below the pressure within the stock canister 22A. A one-way flow valve 62A thus serves to isolate the greater pressure condition existing within stock canister 22A from the lesser pressure condition which exists within the buffer reservoir 60A during the recirculation mode. Preferably, the buffer reservoir 60A is maintained at ambient atmospheric pressure by virtue of three-way solenoid valve 64A. That is, during the recirculation mode, the solenoid valve 64A will be positioned so as to vent the interior space of the buffer reservoir 60A to ambient atmosphere.

The buffer reservoir 60A is of a sufficient size so to accommodate the introduction of a predetermined volume of recirculated paint (for example, approximately 150 ml) during the recirculation mode. That is, with the valve 32A fully opened during the recirculation mode under a command signal from the controller 20, a known quantity of paint per unit time will be caused to flow through the line 14a and hence recirculated through line 44A. Therefore, the internal volume of the buffer reservoir 60A must be at least sufficiently large to allow the entire line 14A to be purged with fresh and stirred paint withdrawn from stock canister 22A. At the start of the recirculation mode, therefore, an internal clock associated with the controller 20 will be initiated. After sufficient time has elapsed corresponding to the total volume of paint needed to ensure complete purging of line 14A, the internal clock associated with the controller 20 will time out thereby stopping the recirculation mode by issuing a command signal to the valve 34A to cause it to assume its closed condition. The filling of the buffer reservoir can be achieved by operating the dosing valve 32A in a fully opened condition and/or by calibrated volumetric strokes.

The buffer reservoir 60A is connected through the solenoid valve 64A to the header 28 via line 66 so as to permit the contents within the buffer reservoir 60A to be pressurized by the pressurization fluid. Thus, upon completion of the recirculation mode as described above, the controller 20 then issues a signal to the solenoid valve 64A so as to cause the solenoid valve 64A to assume a condition whereby, instead of being vented to ambient atmosphere, the buffer reservoir 60A is fluid-connected to the pressurization fluid supplied by header 28 g. In this regard, a pressure regulator 68 disposed in line 66 is set so as to supply the pressurization fluid at a pressure which is about 1 bar greater than the pressure set by the regulator 28b. Thus, once the valve 64A fluid-connects the buffer reservoir 60A to the pressurization fluid within line 66, the recirculated volume of paint within the buffer reservoir 64A is under the influence of a pressure condition which is greater (e.g., by about 1 bar) than the pressure condition existing within the stock canister 22A.

As a result of such fluid-connection between the buffer reservoir 60A and the pressurization line 66, therefore, the recirculated volume of paint within the buffer reservoir 60A is transferred via line 70A through one-way valve 62A to stock tank 22A. It will be realized that such fluid-connection between the buffer reservoir 60A and the pressurization line 66 need only be momentarily established for a time sufficient to allow substantial transfer of the paint contents within the buffer reservoir 60A to the stock tank 22A. Thus, in response to the internal clock associated with controller 20 timing out during the transfer mode, a signal will be issued to the solenoid valve 64A so as to cause it to reestablish communication between the reservoir 60A and ambient atmosphere. At such time, therefore, the one-way valve 62A will again seat to maintain the now greater pressure within the stock tank 22A.

The recirculation and transfer modes described previously with respect to flow loop 10A are similarly achieved with respect to flow loop 10B (and any other number of flow loops associated with the apparatus 10). That is the buffer reservoir 60B, one-way valve 62B, line 70B and the three-way solenoid valve 64B (which momentarily fluid-connects the reservoir 60B to the pressurization line 66 in response to a command signal issued by controller 20) function in a manner identical to that described above with respect to similar structures associated with flow loop 10A.

Figure 4:
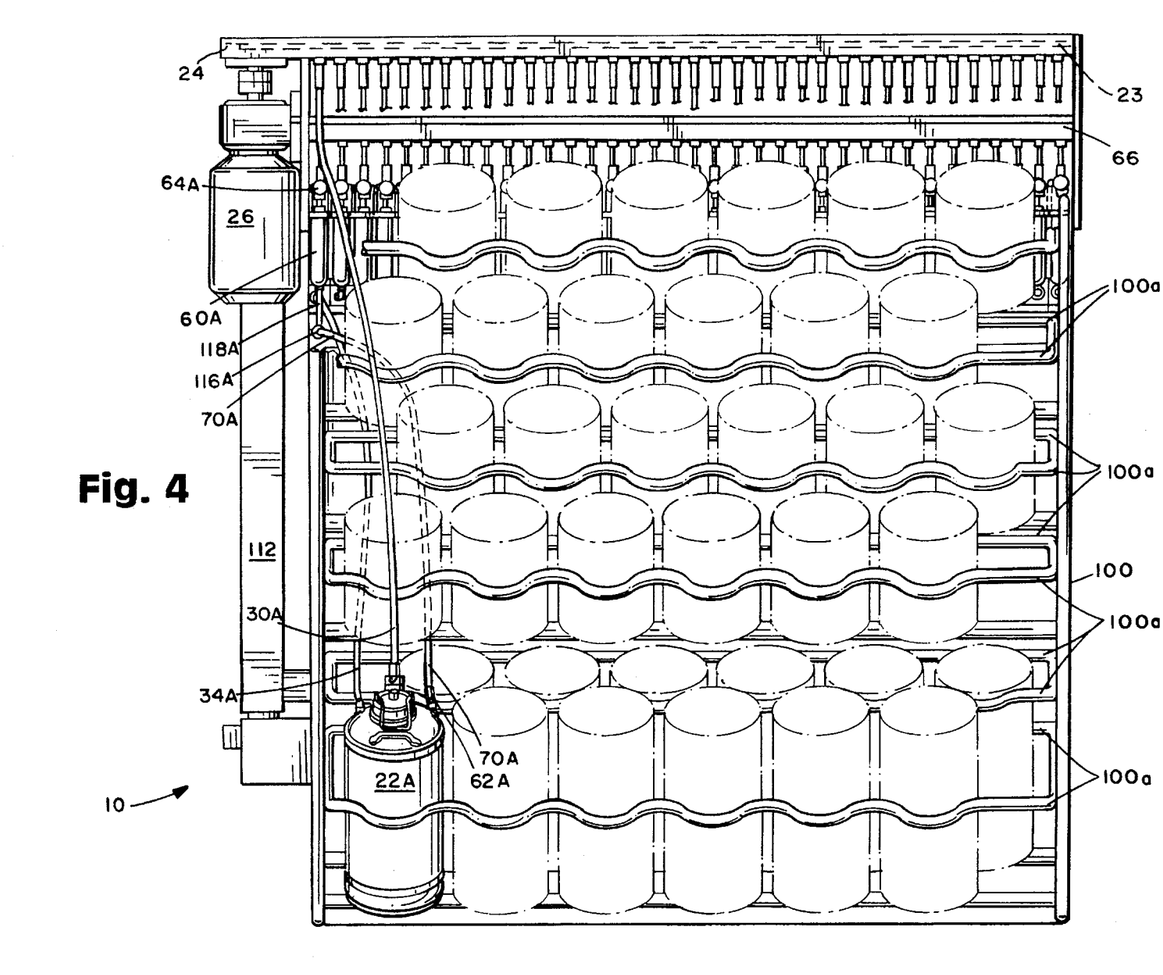
FIG. 4 is a rear elevational view of the automated paint dosing apparatus shown in FIG. 3.

A particularly preferred layout and arrangement of the various structural components described above are perhaps more clearly shown in accompanying FIGS. 3 and 4. In this regard, the structures associated with flow loop 10A and the support/auxiliary structures for the automated dosing apparatus 10 are shown in solid line in accompanying FIGS. 2–3 for clarity of presentation. Those structures associated with other flow loops are shown principally in phantom line and, although they are not be discussed in specific detail, it will be understood that they have similar functions to those structures of flow loop 10A that are discussed.

The automated dosing apparatus 10 will include a suitable frame 100 having several horizontally disposed support racks 100a which serve to support a desired number of the stock containers. The stock container 22A is shown as being in the lowermost row of support racks 100a and is of a larger capacity as compared to similar stock containers positioned in upper support rack rows. Thus, Those paint colors which are used most frequently can be situated in the stock containers of the lowermost row(s) to provide a ready source of paint supply without frequent refilling.

The support frame 100 also supports electronics/equipment cabinets 102 (see FIG. 3) for housing the necessary, electronics and other peripheral equipment. The dosing head 12 is also supported by the frame 100 at a central location above a pedestal 104 and its associated platform 104a on which the gravimetric scale 18 and dispensing container 16 are placed.

The solenoid valves, buffer reservoirs and dosing valves are supported by the frame 100 in organized horizontal banks 106, 108 and 110, respectively. Thus, the solenoid valve 64A, buffer reservoir 60A and dosing valve 32A associated with flow loop 10A are each positioned within their respective organized banks 106, 108 and 110 with similar structures associated with the other flow loops.

A cable chase 112 is preferably provided to establish a space in which the necessary electrical/signal cabling and the like can be routed to the associated structures. Although not show specifically in FIGS. 3 and 4, the pressurization line 28a is connected to the fluid-tight closed manifold 24 in which drive chain 23 is disposed and to line 66 which, in the preferred embodiment shown, is similarly a closed, fluid-tight manifold structure. Thus, connection of the solenoid valve 64A to the manifold 66 via nipple line 114A serves to fluid-connect the solenoid valve 64A to the pressurization fluid provided via header 28 (not shown in FIGS. 3–4, but refer again to FIG. 1). In a similar manner, the solenoid valve 64B associated with flow loop 10B (and the other solenoid valves in bank 106) is fluid-connected to the manifold line 66 via its respective nipple line 114B.

The recirculation line 44A is joined to the transfer line 70A at a T-junction 116A. The T-junction 116 thus serves to fluid-connect each of lines 44A and 70A one to the other, as well as to the buffer reservoir 60A via nipple line 118A. Similarly, a T-junction 116B and nipple line 118B serve to connect the lines 44B, 70B and buffer reservoir 60B associated with flow loop 10B. The other flow loops not specifically described are fluid-connected in a like manner. Thus, only a single port disposed at the bottom of each buffer reservoir is needed to permit both the in-flow and out-flow of paint during the recirculation and transfer modes discussed previously thereby simplifying the buffer reservoirs' structure.

Figure 5A:
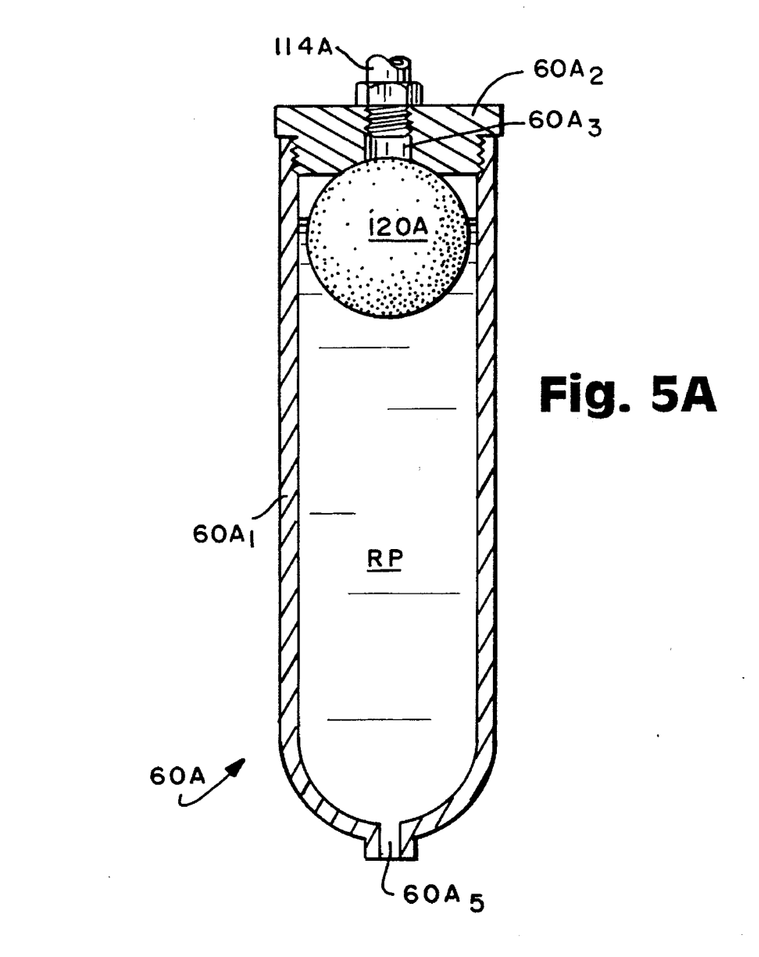
FIGS. 5a and 5b each cross-sectional elevational views of a representative buffer reservoir utilized in the recirculation system in accordance with the present invention respectively showing filled and unfilled conditions thereof.
Figure 5B:
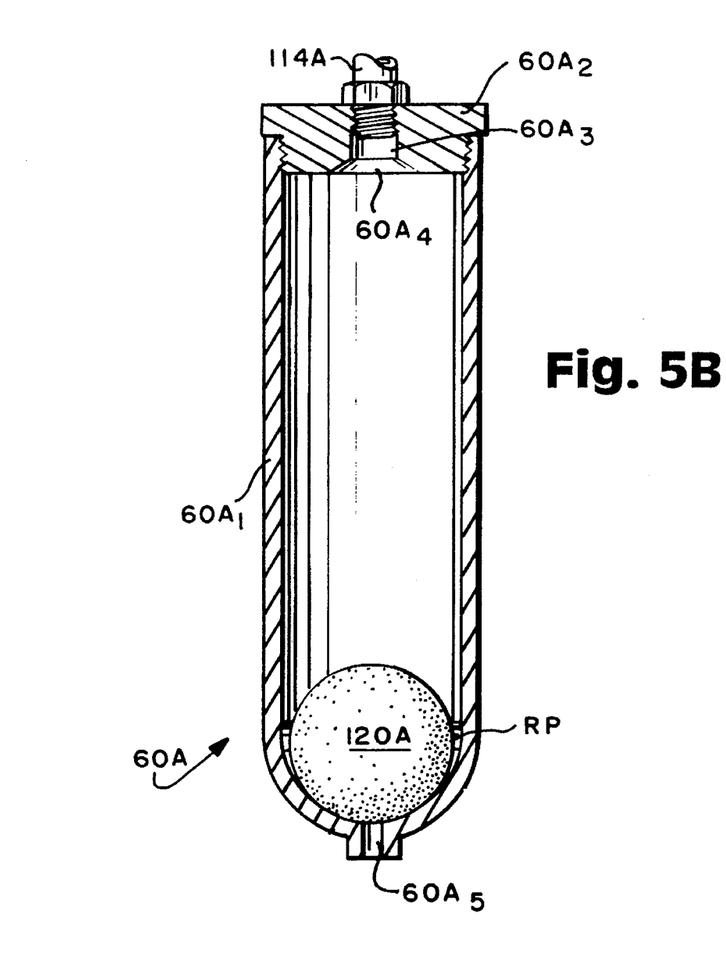

In order to prevent back-flow of paint from the buffer reservoirs into their associated solenoid valves during the recirculation mode, and to prevent the out-flow of pressurizing fluid from the buffer reservoirs during the transfer mode, each buffer reservoir is provided with an internal float valve as shown in accompanying FIGS. 5a and 5b. In this regard, FIGS. 5a and 5b depict buffer reservoir 60A associated with flow loop 10A as representative of the other buffer reservoirs included with the apparatus 10.

As is shown in FIGS. 5a and 5b, the buffer reservoir 60A includes a generally cylindrical body $60A_1$ whose open upper end is sealingly closed by means of a threaded cap structure $60A_2$. The nipple line 114A is therefore fluid-connected to the internal space established within the body $60A_1$ via an upper port $60A_3$ defined in the cap structure $60A_2$. As such, the pressurization fluid may be introduced into the interior space of the buffer reservoir 60A during the transfer mode as described previously.

A spherical float valve 120A is disposed within the interior space of the buffer reservoir 60A. In this regard, the float valve 120A is selected so as to be buoyant in and chemically resistant to the flowable material within the buffer reservoir 60A. For example, when automotive paint is employed in the apparatus 10 according to this invention, it is preferred that the float valve be formed of n-butyl rubber. The preferred n-butyl rubber float valves may be obtained commercially from Harper Leather Goods, Chicago, Ill. Model CT335.

FIG. 5a depicts the state whereby substantially the entire volumetric capacity of the buffer reservoir 60A has been filled with recirculated paint RP during the recirculation mode. Since the float valve 120A is buoyant in the recirculated paint RP, it will rise with the paint level. Normally, the paint level in the buffer reservoir 60A does not rise to the lower end of port $60A_3$. However, in the event that the paint level in the buffer reservoir 60A does rise to an abnormal level, the float valve 120A will then be caused to seat in a segmented spherical (or conical) concavity $60A_4$ formed at the lower end of port $60A_3$ (see FIG. 5b). It will be remembered that, during the recirculation mode, the solenoid valve 64A is vented to the ambient atmosphere. Therefore, upon being seated in concavity $60A_4$, the flow of recirculated paint RP into the buffer reservoir 60A will cease since the pressure existing in the recirculation line 44A will be no greater than the pressure existing within the stock canister 22A. As a result, the float valve 120A functions as a safety valve during the recirculation mode to prevent back-flow of paint into the solenoid 64A (and possibly the pressurization line 66) in the event of controller malfunction or the like.

The float valve 120A also serves as a safety valve during the transfer mode as shown in accompanying FIG. 5b. That is, during the transfer mode, the solenoid valve 64A will be fluid-connected to the pressurization fluid so as to pressurize the interior space of buffer reservoir 60A and thereby transfer substantially all of the recirculated paint RP to the stock canister 22A via line 70A. However, it is desirable to prevent both entrainment of the pressurization fluid (e.g., air) in the recirculated paint as well as to prevent transfer of the pressurization fluid to the stock canister 22A. Since the diameter of the spherical float valve 120A is just slightly less than the internal diameter of the body $60A_1$ of buffer reservoir 60A, the float valve 120A will serve as a barrier against entrainment of the pressurization fluid in the recirculated paint RP when the pressurization fluid enters the buffer reservoir 60A during the transfer mode. Furthermore, since the lower end of the body $60A_1$ of buffer reservoir 60A is hemispherically shaped, it will be forcibly seated by the pressurization fluid against the lower port $60A_5$ when substantially all of the recirculated paint has been transferred to the stock canister 22A. As a result, the pressurization fluid is prevented from entering the line 70A, and hence the stock canister 22A. The float valve 120A thus isolates the greater pressure of the pressurization fluid in line 66 from the lesser pressure of the pressurization fluid in the stock canister 22A (supplied via manifold 24 and line 34A). Furthermore, due to the relatively high fluid velocity that occurs during the transfer mode within the buffer reservoir 60A, the float valve 12A also serves to avoid any atomization effect of air-fluid mixture into the line 70A and the consequent entrapment of air in the material.

Figures 6A, 6B:
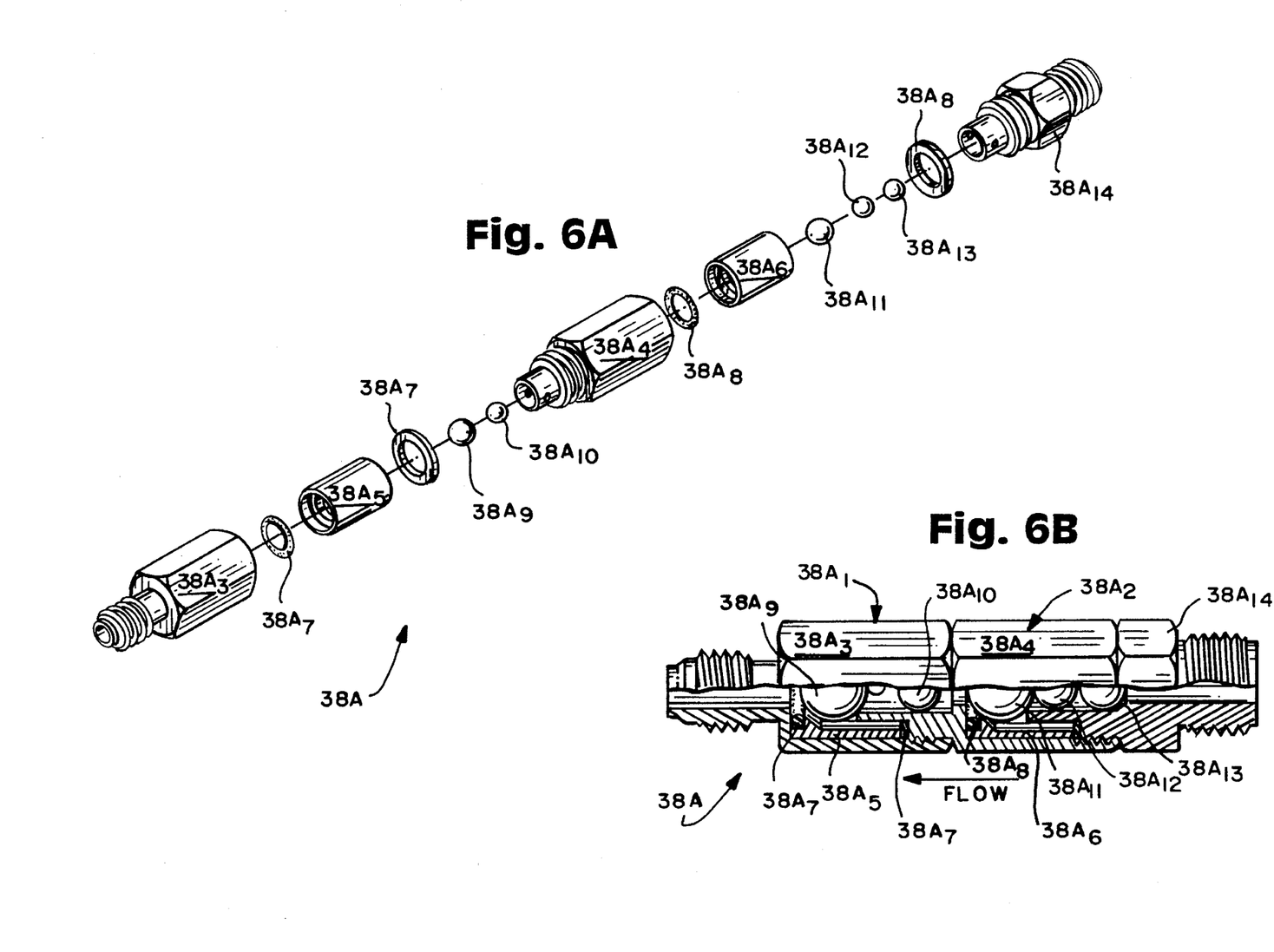
FIGS. 6a and 6b are respectively exploded perspective and partial cross-sectional elevational assembly views of a double check valve employed in the recirculation system according to the present invention.

Accompanying FIGS. 6a and 6b show a particularly preferred form of the vent valves that may be employed according to this invention. In this regard, the vent valve 38A associated with flow loop 10A is shown in FIGS. 6a and 6b as representative of the vent valve 38B associated with flow loop 10B as well as the other vent valves that may be employed in the apparatus 10 according to this invention.

In essence, the vent valve 38A is comprised of a pair of sequentially coupled vent valves $38A_1$ and $38A_2$ which are, in and of themselves essentially conventional. That is, the vent valves $38A_1$ and $38A_2$ are most preferably ball check valves commercially available from Chudnow Valve Company as Part No. S470. The valves $38A_1$ and $38A_2$ will thus include respective valve bodies $38A_3$, $38A_4$, ball retainers/ seats $38A_5$, $38A_6$, and elastomeric O-rings $38A_7$, $38A_8$. The valves $38A_1$ and $38A_2$ are modified, however, according to this invention so as to include a series of balls $38A_9$–$38A_{13}$ which are buoyant in the paint supplied from canister 22A. In this regard, each of the balls $38A_9$–$38A_{13}$ is most preferably formed of polypropylene and is obtained commercially from Machining Technologies, Inc. of Elmore, Ohio. A nipple connector $38A_{14}$ couples the branch line 39A to the valve body $38A_4$.

As paint flows through valve 32A and into line 14A, a portion of the supplied paint will be directed into branch line 39A (see FIG. 1). The paint in branch line 39A will thereby serve to buoyantly force the series of balls $38A_{11}$–$38A_{13}$ to seat against the ball retainer. Seat $38A_6$ and thereby prevent the flow of paint through check valve body $38A_4$. However, in the event that air (or any other gas employed as the pressurization fluid) reaches the valve 38A, it will collect within the valve body $38A_4$. AS a result, the balls $38A_{11}$–$38A_{13}$ will no longer be buoyantly seated against the ball retainer/seat $38A_6$ and will thereby allow the trapped air to escape on to the downstream valve body $38A_3$ of check valve $38A_1$. In the event that no paint is contained within the check valve $38A_1$, the air may then be directed to any suitable venting locating. Thus, check valve $38A_1$ serves as a redundant back-up to the functions provided by check valve $38A_2$. In such a manner, the relief valve 38A allows the pressurization fluid that may be entrained in the paint supplied to the dosing head to be vented from the system.

The apparatus 10 of this invention is compatible with virtually any kind of automotive paint including those paints which include aluminum and/or mica particles which demand careful handling so as to prevent particle damage. All component parts of the apparatus 10 may be made from corrosion and solvent resistant materials so that the apparatus can operate with both solvent-borne and water-borne paints.

Furthermore, the structures of apparatus 10 have been designed so as to be explosion-proof and are thereby in compliance with safety codes presently in effect for flammable material handling equipment. That is, the supply/ recirculation lines have been provided physically outside of all electrical and electronic components which are housed within explosion proof or air-pressurized cabinets with appropriate shut-off devices in the event of low air pressure.

Although the apparatus 10 according to this invention has been described in connection with a presently preferred embodiment whereby automotive paint may be accurately and automatically be dosed, those in this art will realize that other flowable liquid, pastes and/or slurry materials may likewise suitably benefit from the structures/functions described previously.

Therefore, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an automated dosing apparatus having a dosing head for dispensing a dose of flowable material, a supply canister for maintaining a supply of the flowable material under a pressure $P_1$, a supply line which fluid-connects the supply canister to the dosing head, and a flow valve disposed in the supply line having at least closed and opened conditions which respectively prevent and allow the flowable material to flow to the dosing head, the improvement comprising a recirculation system which recirculates the flowable material during a recirculation mode to the supply canister, said recirculation system comprising:

a buffer reservoir;

a recirculation channel within the dosing head which is fluid-connected to the supply line;

a recirculation line which fluid-connects the recirculation channel to the buffer reservoir:

a transfer line which fluid-connects the buffer reservoir and the supply canister;

a source of pressurizing fluid at a pressure $P_2$ greater than the pressure $P_1$ of the supply canister;

a control valve operatively interconnecting the buffer reservoir to the source of pressurization fluid and having a vent condition wherein the buffer reservoir is vented and a pressurization condition wherein the buffer reservoir is fluid-connected to the source of pressurization fluid; and an automated controller operatively connected to the flow and control valves for (i) initiating a recirculation mode by issuing a first signal to cause the flow valve to assume its opened condition and thereby allow the flowable material to flow through the recirculation line to the buffer reservoir, whereby a volume of recirculated flowable material is accumulated within the buffer reservoir, and thereafter (ii) initiating a transfer mode by issuing a second signal to cause the control valve to assume its pressurization condition, the buffer reservoir being pressurized by the pressurization fluid in response to the control valve assuming the pressurization condition to thereby cause the volume of recirculated flowable material within the buffer reservoir to be transferred to the supply canister.

2. In an automated dosing apparatus as in claim 1, the improvement wherein the buffer reservoir includes a port which is fluid-connected to both the recirculation and transfer lines and which thereby allows the volume of recirculated flowable material to flow into and be discharged from the buffer reservoir.

3. In an automated dosing apparatus as in claim 1, the improvement wherein the controller issues a third signal during the transfer mode to cause the flow valve to assume its closed condition.

4. In an automated dosing apparatus as in claim 1, the improvement wherein the control valve is vented to ambient atmosphere when in the vent condition.

5. In an automated dosing apparatus as in claim 1, the improvement further comprising a branch line fluid-connected to the supply line and a one-way relief valve disposed in the branch line to allow gas to be purged therefrom.

6. In an automated dosing apparatus as in claim 1 the improvement wherein the one-way relief valve includes a pair of serially interconnected check valves.

7. In an automated dosing apparatus as in claim 1 or 2, the improvement wherein the butter reservoir includes an internal float valve which is buoyant in the volume of recirculated flowable material.

8. In an automated dosing apparatus as in claim 7, the improvement wherein the buffer reservoir has a cylindrical body, and wherein the internal float valve is spherical and has a diameter closely corresponding to a diameter of the cylindrical body of the buffer reservoir.

9. In an automated dosing apparatus as in claim 1, the improvement wherein the control valve is a three-way solenoid valve.

10. In an automated dosing apparatus as in claim 1, the improvement wherein pressure $P_2$ is about 1 bar greater than pressure $P_1$.

11. In an automated dosing apparatus as in claim 1, the improvement wherein the dosing head includes a dispensing port fluid-connected to the recirculation channel and a plate which obstructs the dispensing port during the recirculation mode to cause the flowable material supplied to the dispensing head by the supply line to be directed into the recirculation line.

12. In an automated dosing apparatus as in claim 1, the improvement comprising a one-way valve in the supply line and positioned closely adjacent the dosing head for preventing uncontrolled dripping of flowable material after a dose thereof has been dispensed.

13. A method of recirculating a flowable material withdrawn from a pressurized supply canister through a dispensing head so that recirculated flowable material discharged from the dispensing head is returned to the supply canister, the method comprising the steps of:

(a) fluid-connecting a buffer reservoir to the dispensing head by a recirculation line and to the supply canister by a transfer line;

(b) establishing a pressure condition within the buffer reservoir during a recirculation mode which is less than a pressure condition within the supply canister to allow recirculated flowable material discharged from the dispensing head to accumulate within the buffer reservoir; and thereafter (c) establishing a pressure condition within the buffer reservoir during a transfer mode which is greater than the pressure condition within the supply canister to cause the accumulated flowable material within the buffer reservoir to be transferred to the supply canister through the transfer line.

14. A method as in claim 13, wherein step (c) is practiced by providing a source of pressurization fluid having a pressure greater than the pressure condition within the supply canister, and a control valve which has an operative position which fluid-connects the source of pressurization fluid to the butter reservoir, and then operating the control valve so that is assumes the operative position thereof.

15. A method as in claim 14, wherein step (b) is practiced by venting the control valve to atmosphere when not in the operative position thereof.

16. A method as in claim 13, further comprising venting accumulated gas from the supply line.

17. A method as in claim 13, further comprising providing an internal float valve within the butter reservoir which is buoyant in the recirculated material accumulated therewithin.

18. A method as in claim 13, further comprising preventing uncontrolled dripping of the flowable material from the dispensing head after a dose thereof has been dispensed.

19. A method as in claim 18, wherein the step of preventing uncontrolled dripping of the flowable material includes positioning a one-way flow valve in a flowable material supply line closely adjacent to the dispensing head.

* * * * *